United States Patent [19]

Chyung et al.

[11] Patent Number: 4,973,564

[45] Date of Patent: * Nov. 27, 1990

[54] BONDING FRITS FOR CERAMIC COMPOSITES

[75] Inventors: Kenneth Chyung, Painted Post; Robert M. Morena, Caton; Mark P. Taylor, Painted Post, all of N.Y.

[73] Assignee: Corning Incorporated, Corning, N.Y.

[ * ] Notice: The portion of the term of this patent subsequent to Feb. 28, 2006 has been disclaimed.

[21] Appl. No.: 402,516

[22] Filed: Sep. 5, 1989

[51] Int. Cl.$^5$ .......................... C03C 10/06; C03C 1/00; C04B 35/52; B32B 3/26

[52] U.S. Cl. .......................................... 501/32; 501/8; 428/312.6

[58] Field of Search .................... 501/8, 32, 89, 95; 428/428, 312.6, 34.4

[56] References Cited

U.S. PATENT DOCUMENTS

| | | | |
|---|---|---|---|
| 2,889,952 | 2/1956 | Claypoole. | |
| 2,920,971 | 1/1960 | Stookey | 501/8 |
| 3,985,532 | 10/1976 | Grossman | 501/8 |
| 4,385,127 | 5/1983 | Chyung | 501/8 |
| 4,589,900 | 5/1986 | Brennan et al. | 65/33 |
| 4,615,987 | 10/1986 | Chyung et al. | 501/8 |
| 4,719,151 | 1/1988 | Chyung et al. | 428/428 |
| 4,755,489 | 7/1988 | Chyung et al. | 501/8 |
| 4,775,596 | 10/1988 | Holleran et al. | 428/428 |
| 4,808,460 | 2/1989 | Chyung et al. | 428/116 |

OTHER PUBLICATIONS

*Glass Ceramics,* McMillen, p. 75.

*Primary Examiner*—William R. Dixon, Jr.
*Assistant Examiner*—Paul Marcantoni
*Attorney, Agent, or Firm*—Kees van der Sterre

[57] ABSTRACT

A sealing method and sealed assemblies incorporating novel devitrifiable sealing frits based on thermally crystallizable alkaline earth aluminosilicate glasses, are disclosed. The frits exhibit improved compatibility with refractory composites employed for the fabrication of high temperature fiber-reinforced glass-ceramic assemblies and can be cured at temperatures below those needed to cure prior art sealing compositions to provide strong seals wherein refractory crystal phases selected from the group consisting of anorthite ($CaO \cdot Al_2O_3 \cdot 2SiO_2$), celsian ($BaO \cdot Al_2O_3 \cdot 2SiO_2$), and sanidine, orthoclase or other potash feldspar ($K_2O \cdot Al_2O_3 \cdot 6SiO_2$) polymorphs constitute the principal phases.

13 Claims, No Drawings

BONDING FRITS FOR CERAMIC COMPOSITES

BACKGROUND OF THE INVENTION

The present invention relates to the manufacture of ceramic matrix composite structures, and more particularly to methods for making such structures from composite component parts by permanent bonding of the parts into a unitary assembly.

Ceramic matrix composite products comprising glass, glass-ceramic, or ceramic matrix materials reinforced with inorganic fibers or whiskers are well known. U.S. Pat. No. 4,615,987, for example, discloses glass-ceramic composites reinforced with silicon carbide fiber wherein the matrix consists of an alkaline earth aluminosilicate glass-ceramic composition. Similar composites wherein the matrix consists of a barium-modified magnesium aluminosilicate glass-ceramic are reported in U.S. Pat. No. 4,589,900, while U.S. Pat. No. 4,755,489 discloses SiC-reinforced glass-ceramics wherein the glass-ceramic matrix contains excess $Al_2O_3$ and consists predominantly of anorthite in combination with mullite or alumina.

Prospective uses for fiber-reinforced ceramic matrix composites such as described in these and other prior patents and literature include use as structural elements in high temperature environments such as heat engines. High temperature ceramic composites for these prospective uses are typically made by hot-pressing or hot isostatic pressing. Unfortunately, these forming processes are generally limited to pieces that are relatively small and/or have a rather simple geometry. The joining of advanced components to form larger assemblies and more complex shapes will thus be a practical requirement for the commercialization of high-technology ceramics.

One approach to the fabrication of complex structures of glass or ceramic composition is that of frit sealing or frit bonding. Frit bonding involves the application to one or several of the components to be sealed of a frit sealing composition, the term frit referring to a finely divided powdered glass. Frits are normally applied as a dispersion in a suitable carrier medium; with the application of heat the frit will melt, flow and bond mating surfaces of the parts together to provide an integral composite structure.

The ceramic bond resulting from the frit sealing process may consist simply of fused glass, or it may be a devitrified or crystallized bond developed in the course of the sealing process. U.S. Pat. No. 2,889,952 describes sealing frits useful for the formation of devitrified seals in cathode ray tube manufacture. As pointed out in that patent, devitrified seals advantageously permit the sealing of parts at relatively low temperatures, while forming a crystalline seal having an upper use temperature well in excess of that of the glass from which it is formed.

The use of devitrified seals in the manufacture of complex structures comprising components which consist of ceramic matrix composites is described in U.S. Pat. No. 4,808,460. As disclosed in that patent, the sealing frits may consist simply of glass frits having the composition of the glass-ceramic matrix materials used in the composites, or they may be modified by the addition of various ceramic fillers such as zircon, aluminum titanate, mullite or cordierite to modify physical properties such as thermal expansion.

The preferred sealing frits in accordance with the patent have compositions close to or identical with the compositions of the matrix materials used in the components to be sealed, to provide thermal expansion matching seals. However, expansion matching seals comprising an added combination of $ZrO_2$ particles and alkaline earth aluminosilicate glass are also disclosed as forming good seals with selected glass-ceramic matrix composite materials.

The performance of the sealing frit in a sandwich or other bonded composite structure will obviously be critical to the performance of the bonded assembly. During the actual high-temperature bonding process, the frit will preferably exhibit a wide temperature region over which it softens and flows without crystallizing, so that good adherence can occur to the composite structure. At some later point in the bonding firing, the frit should undergo extensive crystallization and form refractory phases with a minimum of residual glass. This requirement is particularly important from the standpoint of subsequent high temperature service for the bonded structure.

In addition, both the flow and crystallization processes for the sealing frit must occur at temperatures low enough and times short enough to avoid damage to the bonded composite components. As is well known, the strength and toughness of most present composite materials can be damaged in the course of prolonged exposure to temperatures above the design limits of the material.

The seals described in the prior art do not always satisfy these requirements. For example, in many cases high temperatures are required to achieve full maturation or "curing" of the devitrified seal. The seals are usually closely related in composition to the matrix materials, and the latter are specifically designed for high refractoriness, thus requiring relatively high processing temperatures to achieve full crystallization. Yet full crystallization is required to achieve a seal that will be stable at high use temperatures.

It is also found that the firing of known sealing frits at temperatures below their designed curing temperatures frequently provides seals of substandard strength. This is deemed to be a consequence of the limited melt-flow characteristics of the sealing compositions employed, resulting in low adherence to the composite ceramic substrate. A seal which would exhibit a strength approximating or exceeding the strength of the composite material forming the components of the sealed structure would have substantially improved utility for the fabrication of complex composite structures.

It is therefore a principal object of the present invention to provide sealing frit compositions offering improved sealing capabilities for the fabrication of complex composite structures.

It is a further object of the invention to provide improved sealing frit compositions for composite bonding which may be cured at moderate temperatures.

It is a further object of the invention to provide improved sealing frit compositions for composite bonding which provide higher bond strengths than prior art sealing compositions.

It is a further object of the invention to provide a sealing method which employs novel sealing frits to provide sealed composite assemblies at temperatures lower than possible with prior art sealing frits.

It is a further object of the invention to provide sealed assemblies of glass-ceramic matrix composite components which exhibit high strength and refractoriness.

Other objects and advantages of the invention will become apparent from the following description thereof.

SUMMARY OF THE INVENTION

The sealing frits of the invention are based on thermally crystallizable alkaline earth aluminosilicate glasses, and are thus related in composition to the matrix materials employed for the fabrication of high temperature fiber-reinforced glass ceramic. The frits are provided as thermally crystallizable glass powders, yielding principal crystal phases selected from the group consisting of anorthite ($CaO \cdot Al_2O_3 \cdot 2SiO_2$), celsian ($BaO \cdot Al_2O_3 \cdot 2SiO_2$), and sanidine, orthoclase or other potash feldspar ($K_2O \cdot Al_2O_3 \cdot 6SiO_2$) polymorphs, with minor proportions of gehlenite ($2CaO \cdot Al_2O_3 \cdot SiO_2$) and cordierite ($2MgO \cdot 2Al_2O_3 \cdot 5SiO_2$) also being present in some formulations.

In contrast to the sealing frits utilized for the fabrication of complex composites structures in the prior art, the peak curing or crystallization temperatures of the sealing frits of the invention are sufficiently low that degradation of the ceramic matrix composite components to be bonded is readily avoided. Yet the maximum use temperatures of the frit seals provided in accordance with the invention remain as high or higher than prior art compositions.

In addition, the bonds formed by these low-firing frits when joining fiber-reinforced composite components together have strengths approaching or in many cases exceeding the cross-ply tensile strength of the ceramic matrix composite components themselves. Thus structural strength in assemblies provided using these seals is limited not by the strength of the seals but by the strength of the components.

The compositions of the thermally crystallizable glasses useful for providing sealing frits in accordance with the invention will be selected from one of the following alkaline earth aluminosilicate composition regions:

I. glasses consisting essentially, in weight percent, of about 36–43% $SiO_2$, 15–25% $Al_2O_3$, 20–25% BaO, 5–10% $K_2O$, 0–1% $As_2O_3$, 0–5% $ZrO_2$, and 0.5–6% $B_2O_3$, the glasses being thermally crystallizable to yield celsian as the principal crystal phase and potash feldspar as a minor phase;

II. glasses consisting essentially, in weight percent, of about 43–53% $SiO_2$, 24–36% $Al_2O_3$, 12–16% CaO, 2–7% $K_2O$, 0–1% $As_2O_3$, 0–5% $ZrO_2$, and 0–6% $B_2O_3$, the glasses being thermally crystallizable to yield anorthite as the principal crystal phase and potash feldspar as a minor phase; III. glasses consisting essentially, in weight percent, of about 24–44% $SiO_2$, 26–38% $Al_2O_3$, 5–35% CaO, 0–35% BaO, 0–4% $K_2O$, 0–1% $As_2O_3$, 0–5% $ZrO_2$, and 0–6% $B_2O_3$, the glasses being thermally crystallizable to yield anorthite and/or celsian as the principal crystal phases and gehlenite as a minor phase;

IV. glasses consisting essentially, in weight percent, of about 35–55% $SiO_2$, 25–37% $Al_2O_3$, 0.5–7% MgO, 1–8% $K_2O$, 0–20% CaO, 0–1% $As_2O_3$, 0–6% $ZrO_2$, and 0–6% $B_2O_3$, the glasses being thermally crystallizable to yield anorthite and/or cordierite as the principal crystal phases and potash feldspar as a minor phase; and V. glasses consisting essentially, in weight percent, of about 35–42% $SiO_2$, 34–46% $Al_2O_3$, 16–20% CaO, 0–1% $As_2O_3$, 0–5% $ZrO_2$, and 0.5–5% $B_2O_3$, the glasses being thermally crystallizable to yield anorthite as the principal crystal phase. These latter glasses may be combined with a minor addition of particulate crystalline $ZrO_2$ intermixed therewith to improve the quality of the sealing interface.

The invention also provides an improved method for sealing one or more alkaline earth aluminosilicate glass-ceramic matrix composite components into a refractory bonded assembly. In accordance with that method, a thermally crystallizable alkaline earth aluminosilicate glass sealing frit having a composition such as above described is provided as a layer or other member between a first mating surface provided on the composite component and a second mating surface on at least one other component of the refractory bonded assembly. Then, while maintaining the first and second mating surfaces in contact with the glass sealing frit, at least the first and second mating surfaces and glass sealing frit are heated to a temperature sufficient to melt and thermally crystallize the sealing frit.

The resulting crystallized seal provides better bonding at lower crystallization temperatures than the sealing frits utilized for the purpose in the prior art. Advantageously and preferably, the curing temperature will not exceed about 1150° C., although of course higher temperatures may be used to achieve equivalent bonding if very short curing times are desired.

Further, the invention includes a bonded refractory assembly provided in accordance with the method above described, that assembly including at least one alkaline earth aluminosilicate glass-ceramic matrix composite component bonded with a crystalline seal to at least one other refractory component. The crystalline seal is characterized by a composition which is selected from:

I. crystallized glasses consisting essentially, in weight percent, of about 36–43% $SiO_2$, 15–25% $Al_2O_3$, 20–25% BaO, 5≧10% $K_2O$, 0–1% $As_2O_3$, 0–5% $ZrO_2$, and 0.5–6% $B_2O_3$ and comprising celsian as the principal crystal phase and potash feldspar as a minor phase;

II. crystallized glasses consisting essentially, in weight percent, of about 43–53% $SiO_2$, 24–36% $Al_2O_3$, 12–16% CaO, 2–7% $K_2O$, 0–1% $As_2O_3$, 0–5% $ZrO_2$, and 0–6% $B_2O_3$ and comprising anorthite as the principal crystal phase and potash feldspar as a minor phase;

III. crystallized glasses consisting essentially, in weight percent, of about 24–44% $SiO_2$, 26–38% $Al_2O_3$, 5–35% CaO, 0–35% BaO, 0–4% $K_2O$, 0–1% $As_2O_3$, 0–5% $ZrO_2$, and 0–6% $B_2O_3$ and comprising anorthite and/or celsian as the principal crystal phases and gehlenite as a minor phase; IV. crystallized glasses consisting essentially, in weight percent, of about 35–55% $SiO_2$, 25–37% $Al_2O_3$, 0.5–7% MgO, 1–8% $K_2O$, 0–20% CaO, 0–1% $As_2O_3$, 0–6% $ZrO_2$, and 0–6% $B_2O_3$ and comprising anorthite and/or cordierite as the principal crystal phases and potash feldspar as a minor phase; and V. crystallized glasses consisting essentially, in weight percent, of about 35∝42% $SiO_2$, 34–46% $Al_2O_3$, 16–20% CaO, 0–1% $As_2O_3$, 0–5% $ZrO_2$, and 0.5–5% $B_2O_3$, wherein anorthite constitutes the principal crystal phase, and wherein the glasses further include an optional addition of crystalline zirconia in a proportion of 0–15% by weight of the crystallized seal.

Preferably, the alkaline earth aluminosilicate glass-ceramic matrix composite component bonded into the assembly is a fiber-reinforced composite wherein an anorthite-containing glass-ceramic constitutes the matrix of the composite and the fiber reinforcement comprises silicon carbide or silicon oxycarbide fibers.

DETAILED DESCRIPTION

The sealing frits of the present invention satisfy five basic requirements of key importance in the fabrication of bonded ceramic matrix composite products. These are: (i) chemical and thermal compatibility with refractory calcium aluminosilicate glass-ceramic matrix composite materials and silicon carbide fiber reinforcement; (ii) good crystallization characteristics at frit curing temperatures not exceeding about 1150° C.; (iii) a wide thermal curing range, i.e., a large interval of temperature (preferably at least about 150° C.) between the flow temperature and the crystallization temperature of the frit; (iv) a service temperature of at least 900° C., preferably at least 1100° C.; and (v) a bond strength in the cured state of at least about 2500 psi to refractory calcium aluminosilicate glass-ceramic matrix composite materials.

As previously mentioned, difficulties attending the use of prior art frit formulations intended for the bonding of ceramic matrix composite parts include a relatively short working range and the need for relatively high sealing temperatures to obtain full curing of the seal. Table I below sets forth examples of some prior art formulations, and indicates some of the principal characteristics of the seals provided thereby.

Included in Table I for selected examples are an indication of the type of crystal phase present in the seal, the curing temperature needed to achieve full crystallization, the working range dT for the material, where dT is the temperature interval between the transition temperature $T_g$ and the crystallization temperature $T_c$ of the glass, and the service temperatures of the resulting seals.

TABLE I

|  | A | B | C |
| --- | --- | --- | --- |
| SiO$_2$ | 39.5 | 37.4 | 43.1 |
| Al$_2$O$_3$ | 38.5 | 36.3 | 22.8 |
| CaO | 18.4 | 17.4 | — |
| BaO | — | — | 24.0 |
| ZrO$_2$ | 3.0 | 2.8 | 3.0 |
| As$_2$O$_3$ | 0.5 | 0.5 | 0.75 |
| K$_2$O | — | — | 6.33 |
| B$_2$O$_3$ | — | 5.7 | — |
| Crystal Phase(s) | anorthite | anorthite | celsian, potash feldspar |
| Curing Temperature | 1250° C. | 1100° C. | 1250° C. |
| dT | 130° C. | — | >200° C. |
| Bond Strength (at 1100° C.) | 2040 psi | 2890 psi | 2100 psi |
| Service Temperature | 1200° C. | 850° C. | 1250° C. |

As is evident from Table I, frit compositions A and C require relatively high curing temperatures with composition A also exhibiting a short working range. Composition B has a lower curing temperature, but also demonstrates a relatively low service temperature as estimated from the annealing temperature of the cured seal. And, when cured at 1100° C., compositions A and C provide seal strengths below the 2500 psi level generally desired for multicomponent structures comprising refractory calcium aluminosilicate components.

Examples of improved sealing frit compositions within the scope of the invention are reported in Table II below. As in the case of the known sealing frits, each of the novel compositions reported is physically and chemically compatible with anorthite-based calcium aluminosilicate glass-ceramic matrix materials, in that cured coatings of each of the frits show no crazing, debonding, blistering or other adverse interactions with such materials.

In addition, each of these compositions provides seals which are non-porous, well bonded, and well crystallized after curing at 1100-1150° C. for three hours. Further, the thermal expansion coefficients of the crystallized frit seals are in the range of about 40-55×10$^{-7}$/° C., values which are considered to be appropriate for sealing to anorthite-based glass-ceramic composites.

Included in Table II for each of the compositions reported are the oxide components and proportions thereof in each glass, in parts by weight, and an indication of the principal celsian or anorthite (anorth.) crystal phase present in each glass when crystallized, followed by minor phases present, if any. Also reported are the preferred curing temperatures for each of the compositions.

TABLE II

| Oxide | 1 | 2 | 3 | 4 | 5 |
| --- | --- | --- | --- | --- | --- |
| SiO$_2$ | 40.8 | 39.7 | 47.9 | 45.9 | 45.6 |
| Al$_2$O$_3$ | 21.6 | 21.0 | 30.1 | 31.8 | 28.6 |
| CaO | — | — | 13.7 | 15.5 | 13.0 |
| BaO | 22.7 | 22.1 | — | — | — |
| ZrO$_2$ | 2.9 | 2.8 | 2.9 | 2.9 | 2.9 |
| As$_2$O$_3$ | 0.7 | 0.7 | 0.5 | 0.5 | 0.5 |
| K$_2$O | 6.0 | 8.6 | 4.9 | 3.3 | 4.6 |
| B$_2$O$_3$ | 4.7 | 4.6 | — | — | 4.8 |
| Crystal Phase(s) | celsian, potash feldspar | celsian, potash feldspar | anorth., potash feldspar | anorth., potash feldspar | anorth., potash feldspar |
| Curing Temp. | 1100° C. | 1100° C. | 1100° C. | 1100° C. | 1000° C. |
| Oxide | 6 | 7 | 8 | 9 | 10 |
| SiO$_2$ | 32.9 | 53.2 | 39.4 | 39.2 | 38.8 |
| Al$_2$O$_3$ | 30.7 | 27.8 | 38.3 | 38.1 | 37.7 |
| CaO | 12.2 | 3.9 | 18.3 | 18.2 | 18.0 |
| BaO | 28.3 | — | — | — | — |
| ZrO$_2$ | — | 3.0 | 3.0 | 3.0 | 2.9 |
| As$_2$O$_3$ | 0.5 | 0.5 | 0.5 | 0.5 | 0.5 |
| K$_2$O | 1.7 | 6.4 | — | — | — |
| B$_2$O$_3$ | — | — | 0.5 | 1.0 | 2.0 |
| MgO | — | 5.5 | — | — | — |
| Crystal Phase(s) | celsian gehlenite | anorth., potash feldspar, cordierite | anorth., | anorth., | anorth., |
| Curing Temp. | 1100° C. | 1100° C. | 1150° C. | 1150° C. | 1150° C. |

The curing temperatures for sealing frits such as shown in Table II are most accurately determined by X-ray diffraction analysis of frit samples subjected to various curing temperatures and times. The minimum temperature at which full crystallization of a frit sample can be achieved within about three hours is reported as the curing temperature for the material. Of course, depending upon the resistance to thermal degradation of the composite component(s) being assembled, higher curing temperatures can be used if desired. The principal benefit obtained in that case is a shorter curing cycle than is possible with higher-curing prior art compositions.

Each of the frit compositions shown in Table II can be compounded and melted to form homogeneous glass by known melting methods. Frits can then be easily formed from the resulting glasses by conventional processing, as by drigaging or ribbon-rolling the melt and then ball-milling the resulting coarse powder to yield fine glass powder. Preferably, the final frit will have a mean particle size in the range of approximately 5–10 μm.

The bond strength of the bonding frits of the invention can be tested by using them to seal together test plates of silicon carbide-reinforced ceramic matrix composite materials. The composite material preferably employed is a high-temperature composite material having a matrix of the glass-ceramic reported as Example A in Table I above, and is provided in the form of two ⅜" diameter composite disks. The fiber reinforcement in the material consists of Nicalon™ silicon oxycarbide fiber yarn, the latter material being commercially available as NLM-202 silicon carbide yarn from the Nippon Carbon Company of Tokyo, Japan.

To seal the plate assembly for testing, a paste of the selected frit is prepared by blending the frit with an ethylene glycol vehicle, and then applying a layer of the paste to one of the contacting surfaces of the plates. The resulting assembly is then cured at 1100° C. for two to three hours.

After curing, metal pins are cemented to the outer faces of each assembly using a cyanoacrylate adhesive. The pins are then fastened in opposed tensile loading fixtures on an Instron Model 1331 tensile testing machine, and tensile force is applied to the cured sealing frit at a cross-head speed of about 0.05 cm/min until failure of the sealed assembly is induced.

The recommended upper use temperature for sealing frits such as those of the invention is typically a temperature near the annealing point temperature of the crystallized frit material. The annealing point temperature, corresponding to that temperature at which the viscosity of a cured sample of the sealing material is about $10^{13}$–$10^{14}$ poises, may be determined by conventional viscosity testing on bending beam samples of the fully cured material.

Table III below sets forth selected sealing properties for the frit compositions reported in Table II above, the sample numbers in Table III corresponding to those in Table II. Included in Table III where recorded on individual samples are the working range dT of the composition, reported as the difference between the glass transition and minimum crystallization temperatures of the material, the average (mean) bond strength of the material in psi as determined by tensile testing of sealed assemblies as above described, and the recommended maximum service temperatures of each of the compositions. Estimated values (*) are given where actual measurement data are not provided.

As is evident from the data reported in Table III, each of the frit compositions of Table II exhibit a working range in excess of 150° C. and bond strength of at least 2500 psi. Significantly, Examples 1 and 2, which are of the celsian type, show complete curing to high strength at 1100° C., in contrast to prior art celsian-based frits which exhibit seal crazing and/or low bond strength if cured at temperatures in this range. Thus 1100° C. curing of celsian composition C as shown in Table I results in seal strengths only on the order of about 2100 psi. The total omission of $B_2O_3$ from these compositions provides materials which will not bond well even at 1150° C., but which instead require curing at temperatures as high as 1250° C.

With regard to Examples 3–5 of Table II, these anorthite/potash feldspar compositions exhibit excellent stability at the stated maximum use temperature despite the presence of the alkali component $K_2O$ therein. This behavior is attributed to the fact that anorthite and potash feldspar phases may coexist with stability at the use temperatures required. Particularly advantageous is the fact that, in several of these compositions, the service temperature of the seal exceeds the required curing temperature.

The high bond strengths observed in the orthoclase, sanidine, or other potash feldspar systems may be partly due to the required presence of $K_2O$ therein. Increased flexural strength, perhaps due to improved fiber/matrix bonding, has been observed in some carbon-fiber-reinforced glass-ceramic composite systems when potassium is added to the glass-ceramic matrix. The desirable refractoriness achievable with these sealing frits is aided by the fact that $B_2O_3$, which in excessive amounts can lower the use temperature of the seal, is merely optional and preferably used only in moderate proportions.

The long term stability of anorthite seals containing potash feldspar phases, such as Examples 3–5, is further illustrated by high-temperature creep tests performed on these seals. In one test, a 3-plate lap joint sealed with composition 4 of Table II showed a creep rate in shear of less that 0.02% per hour under a 500 psi compressive stress, even at temperatures up to 1150° C.

Compositions 6 and 7 also contain $K_2O$ and thus appear to provide improved bonding with carbide-fiber-containing composite structures.

The maximum bond strengths demonstrated by the compositions of Examples 1–7 of Table II are generally in the range of about 3,000 psi. These values begin to approach the cross-ply tension strength of the composite itself (3000–4500 psi), but of course further enhancements in seal strength, capable of providing joint strengths equivalent to or exceeding those strengths of the component parts, would be desirable.

TABLE III

| Composition | 1 | 2 | 3 | 4 | 5 |
|---|---|---|---|---|---|
| dT | >150° C.* | >150° C.* | 190° C. | 180° C. | 200° C. |
| Bond Strength | 2820 | >2500* | 2880 | 3070 | 2690 |
| Service Temp. | 900° C. | 900° C. | 1200° C. | 1200° C. | 1000° C. |
| Composition | 6 | 7 | 8 | 9 | 10 |
| dT | >150° C.* | >150° C.* | 190° C. | 180° C. | 200° C. |
| Bond Strength | >2500* | >2500* | >3840 | >4390 | 2500 |
| Service Temp. | 1100° C. | 1000° C. | 1100° C. | 1000° C. | 900° C. |

Examples 8–10 of Table II are representative of the anorthite-based sealing compositions of the invention which are substantially free of orthoclase and related polymorphs. These compositions provide a combination of relatively low sealing temperature and exceptional seal strength. Thus seal strength values up to and exceeding 4,000 psi have been observed in these systems. At these strength levels, failure of the seal test specimens frequently occurs within one of the composite plate components, rather than within or adjacent to the seal joint, during strength testing as above described.

The attainment of these properties is achieved through the addition of a small effective amount of $B_2O_3$ to a defined family of anorthite base compositions. This additive may act to increase the flow properties of the bonding frit, but if present in excess can undesirably reduce the service temperature thereof. However, the use of quantities of $B_2O_3$ in excess of about 5% by weight is to be avoided since such will reduce service temperature due to pronounced flow and creep in the cured seal.

As an optional constituent of the potassium-free sealing compositions of the invention, a small amount (5–15% by weight) of a particulate zirconia additive such as partially-stabilized tetragonal zirconia (t-ZrO2) may be incorporated as a mill additive to the powdered frit. The function of particulate $ZrO_2$ to improve bond strength is not clear, although scanning electron micrograph data suggest that the presence of this agent appears to facilitate a more coherent frit/composite interface than achieved with seals not comprising particulate $ZrO_2$.

Table IV below sets forth compositions illustrative of orthoclase-free anorthite sealing compositions comprising mill additions of zirconia. The oxide components of the glass compositions are recorded in parts by weight, approximating weight percent values, while the $ZrO_2$ additions are reported in parts by weight added to the base glasses.

Also included in Table IV are representative properties of sealing frits and seals provided from the illustrative compositions. The bond strengths reported are again average (mean) values as determined from a series of strength tests; where the indicated strength is greater than (>) the reported value, the uncertainty resulted from the failure of a composite component, rather than a seal, in the course of testing.

prises about 50 g total of powdered $ZrO_2$ and glass frit of the selected composition dispersed in 750 ml of isopropanol and 250 ml of distilled water. The source of the $ZrO_2$ utilized is not critical; a suitable material is TZ3Y yttria-doped zirconia commercially available from the Toya Soda Company of Tokyo, Japan. Following wet-mixing, the mixture of glass frit and particulate $ZrO_2$ can simply be dried, and later mixed with an appropriate vehicle for use in sealing.

As is evident from an inspection of the data set forth in Tables III and IV above, the potassium-free anorthite sealing frits of the invention offer particularly high sealing strength with only moderate curing temperatures being required. However, service temperatures are not quite as high as the strong-bonding $K_2O$-containing anorthite compositions of Tables II and III. Further, while the highest strengths have been observed in $ZrO_2$-free compositions containing 0.5–1.0% $B_2O_3$, zirconia additions do appear to enhance strength in the compositions containing more than 1% $B_2O_3$.

The improved bonding behavior resulting from $B_2O_3$ and optional $ZrO_2$ additions presently appears to be limited to orthoclase-free anorthite frits alone. Zirconia additions to other frits, including the celsian-based frits, produce bond weakening, while $B_2O_3$ additions to anorthite/orthoclase frits failed to produce bonding improvements. Similarly, mill additions to these frits other than zirconia, such as silicon carbide whiskers, likewise appear to reduce bond strength in these sealing systems.

As previously indicated, the sealing frits of the invention are particularly well suited for the production of sealed assemblies comprising high temperature glass-ceramic matrix composite components. These are assemblies of two or more composite components, joined by one of the sealing frits hereinabove described, wherein the matrix of the composite components consists essentially of a refractory calcium aluminosilicate glass-ceramic comprising a predominant crystal phase consisting essentially of triclinic anorthite, usually in combination with at least one of mullite and alpha alumina.

Matrix glass-ceramics of this type are known. U.S. Pat. No. 4,755,489, for example, describes glass-ceramic materials and fiber-reinforced composites produced by the thermal crystallization of glasses consisting essentially, in weight percent, of about 16–20% CaO, 38.5–46% $Al_2O_3$, 35–42% $SiO_2$, 0.25–1.5% $As_2O_3$, and up to 10% total of at least one nucleating agent selected in the indicated proportion from the group consisting of

TABLE IV

| Oxide | 11 | 12 | 13 | 14 | 15 | 16 |
|---|---|---|---|---|---|---|
| $SiO_2$ | 39.4 | 39.2 | 39.2 | 38.8 | 38.8 | 38.8 |
| $Al_2O_3$ | 38.3 | 38.1 | 38.1 | 37.7 | 37.7 | 37.7 |
| CaO | 18.3 | 18.2 | 18.2 | 18.0 | 18.0 | 18.0 |
| $ZrO_2$ | 3.0 | 3.0 | 3.0 | 2.9 | 2.9 | 2.9 |
| $As_2O_3$ | 0.5 | 0.5 | 0.5 | 0.5 | 0.5 | 0.5 |
| $B_2O_3$ | 0.5 | 1.0 | 1.0 | 2.0 | 2.0 | 2.0 |
| t-$ZrO_2$ Addition | 15.0 | 5.0 | 10.0 | 5.0 | 10.0 | 20.0 |
| Curing Temp. (°C.) | 1150° | 1150° | 1150° | 1150° | 1150° | 1150° |
| Bond Strength | >3600 | 4320 | >3500 | 2880 | >3370 | >2980 |
| Crystal Phase(s) | anorth. (+$ZrO_2$) | anorth. (+$ZrO_2$) | anorth. (+$ZrO_2$) | anorth. (+$ZrO_2$) | anorth. (+$ZrO_2$) | anorth. (+$ZrO_2$) |
| Service Temp. | 1150° | 1100° | 1100° | 1000° | 1000° | 1100° |

The t-ZrO2 additions to the frit compositions shown in Table IV are preferably made by wet-mixing the frit with the zirconia. A suitable wet-mixing slurry com- 0.1–3% Cr$_2$O$_3$, 0.25–3% HfO$_2$, 2–5% MoO$_3$, 0.25–3% Nb$_2$O$_5$, 0.25–3% Ta$_2$O$_5$, 0.25–3% WO$_3$, and 1–10% ZrO$_2$, the composition being substantially free of TiO$_2$ and containing Al$_2$O$_3$ in an amount which is at least 10 mole percent and up to 50 mole percent in excess of that present in stoichiometric triclinic anorthite.

An alternative matrix material for composite components is disclosed in U.S. Pat. No. 4,615,987, being produced through the crystallization of glasses consisting essentially, in weight percent, of about 0–25% CaO, 0–30% SrO, 10–30% CaO+SrO, 0–15% MgO, 0–25% BaO, 0–4% Na$_2$O, 0–6% K$_2$O, 25–38% Al$_2$O$_3$, 35–60% SiO$_2$, 0–15% ZrO$_2$, 0–3% As$_2$O$_3$, 0–30% total of BaO+MgO+Na$_2$O+K$_2$O+TiO$_2$+ZrO$_2$ +As$_2$O$_3$, and 0–10% total of nucleating agents selected in the indicated proportion from the group consisting of 0.1–3% Cr$_2$O$_3$, 0.25–3% HfO$_2$, 2–5% MoO$_3$, 0.25–3% Nb$_2$O$_5$, 0.25–3% Ta$_2$O$_5$, and 0.25–3% WO$_3$. The predominant crystal phase in these materials is selected from the group of anorthite (CaO·Al$_2$O$_3$·2SiO$_2$) and its pseudo-binaries with mullite (3Al$_2$O$_3$·2SiO$_2$), cordierite (2MgO·2Al$_2$O$_3$·5SiO$_2$), barium osumilite (BaO·2MgO·3Al$_2$O$_3$·9SiO$_2$), albite solid solution (Na$_2$O·Al$_2$O$_3$·6SiO$_2$), Al$_2$O$_3$, SiO$_2$, CaO·SiO$_2$, and gehlenite (2CaO·Al$_2$O$_3$·SiO$_2$).

Composite components to be sealed in accordance with the invention will further comprise, in addition to one of the matrix materials above described, a reinforcing phase consisting of silicon carbide or silicon oxycarbide fibers or whiskers. Examples of such fibers include the above-disclosed Nicalon™ fibers as well as other fibers of similar composition. Of course the matrix may comprise other reinforcing phases such as silicon carbide or other whiskers or chopped fiber reinforcement, if desired. The reinforcing fibers will generally make up about 15–70% by volume of the composite structures forming the components of the bonded assemblies of the invention, with the glass-ceramic matrix making up the remainder of those components.

In carrying out the sealing of composite components in accordance with the invention, the means by which the sealing frit is applied to the component parts to be sealed is not critical. Typically, the frit composition will be applied to the mating surfaces of one or both of the components to be sealed in the form of a suspension or dispersion of the frit in a suitable vehicle, application being by a technique providing good contact between the frit and the composite component or components. The mating surfaces of the components will then be clamped or otherwise placed together and the assembly and frit will be heated together to thermally cure the frit via melting and conversion to a highly crystalline glass-ceramic bonding seal.

The curing conditions employed are not restricted by the nature of the sealing frit, provided that a temperature sufficient to cure the frit is achieved. However, temperature and/or curing atmosphere limitations may be imposed by the nature of the glass-ceramic matrix composite components being sealed. Generally, the use of curing temperatures not exceeding about 1150° C. will be preferred to protect the composite components from the risk of thermal damage.

While the invention has been particularly described above with respect to specific materials and specific procedures, it will be recognized that those materials and procedures are presented for purposes of illustration only and are not intended to be limiting. Thus numerous modifications and variations upon the compositions and processes specifically described herein may be resorted to by those skilled in the art within the scope of the appended claims.

We claim:

1. A method for sealing a fiber-reinforced alkaline earth aluminosilicate glass-ceramic matrix composite component into a refractory bonded assembly of two or more components which comprises the steps of:
   providing a thermally crystallizable alkaline earth aluminosilicate glass sealing frit between a first mating surface provided on said composite component and a second mating surface on at least one other component of the refractory bonded assembly; and
   while maintaining the first and second mating surfaces in contact with the glass sealing frit, heating at least the first and second mating surfaces and glass sealing frit to a temperature sufficient to melt and thermally crystallize the sealing frit;
   wherein the glass sealing frit has a composition selected from:
   I. glasses consisting essentially, in weight percent, of about 36–43% SiO2, 15–25% Al2O3, 20–25% BaO, 5–10% K2O, 0–1% As2O3, 0–5% ZrO2, and 0.5–6% B2O3, the glasses being thermally crystallizable to yield celsian as the principal crystal phase and potash feldspar as a minor phase;
   II. glasses consisting essentially, in weight percent, of about 43–53% SiO2, 24–36% Al2O3, 12–16% CaO, 2–7% K2O, 0–1% As2O3, 0–5% ZrO2, and 0–6% B2O3, the glasses being thermally crystallizable to yield anorthite as the principal crystal phase and potash feldspar as a minor phase;
   III. glasses consisting essentially, in weight percent, of about 35–55% SiO2, 25–37% Al2O3, 0.5–7% MgO, 1–8% K2O, 0–20% CaO, 0–1% As2O3, 0–6% ZrO2, and 0–6% B2O3, the glasses being thermally crystallizable to yield anorthite and/or cordierite as the principal crystal phases and potash feldspar as a minor phase; and
   IV. glasses consisting essentially, in weight percent, of about 35–42% SiO2, 34–46% Al2O3, 16–20% CaO, 0–1% As2O3, 0–5% ZrO2, and 0.5–5% B2O3, the glasses being thermally crystallizable to yield anorthite as the principal crystal phase and optionally comprising 0–15% by weight of a particulate ZrO2 additive intermixed therewith;
   said glass sealing frit exhibiting a thermal curing range of at least 150° C. between the flow temperature and the crystallization temperature of the frit, and being curable to a crystalline seal at a temperature not exceeding about 1150° C.

2. A method in accordance with claim 1 wherein the composite component comprises silicon carbide or silicon oxycarbide fibers as a reinforcing phase and an anorthite-containing calcium aluminosilicate glass-ceramic as the matrix phase.

3. A method in accordance with claim 2 wherein the thermally crystallizable alkaline earth aluminosilicate glass sealing frit is a glass consisting essentially, in weight percent, of about 36–43% SiO2, 15–25% Al2O3, 20–25% BaO, 5–10% K2O, 0–1% As2O3, 0–5% ZrO2, and 0.5–6% B2O3.

4. A method in accordance with claim 2 wherein the thermally crystallizable alkaline earth aluminosilicate glass sealing frit is a glass consisting essentially, in weight percent, of about 43-53% $SiO_2$, 24-36% $Al_2O_3$, 12-16% CaO, 2-7% $K_2O$, 0-1% $As_2O_3$, 0-5% $ZrO_2$, and 0-6% $B_2O_3$.

5. A method in accordance with claim 2 wherein the thermally crystallizable alkaline earth aluminosilicate glass sealing frit is a glass consisting essentially, in weight percent, of about 35-55% $SiO_2$, 25-37% $Al_2O_3$, 0.5-7% MgO, 1-8% $K_2O$, 0-20% CaO, 0-1% $As_2O_3$, 0-6% $ZrO_2$, and 0-6% $B_2O_3$.

6. A method in accordance with claim 2 wherein the thermally crystallizable alkaline earth aluminosilicate glass sealing frit is a glass consisting essentially, in weight percent, of about 35-42% $SiO_2$, 34-46% $Al_2)_3$, 16-20% CaO, 0-1% $As_2O_3$, 0-5% $ZrO_2$, and 0.5-5% $B_2O_3$.

7. A bonded refractory assembly comprising at least one alkaline earth aluminosilicate glass-ceramic matrix composite component bonded with a crystalline seal to at least one other refractory component, wherein the crystalline seal is a crystallized composition selected from:
  I crystallized glasses consisting essentially, in weight percent, of about 36-43% $SiO_2$, 15-25% $Al_2O_3$, 20-25% BaO, 5-10% $K_2O$, 0-1% $As_2O_3$, 0-5% $ZrO_2$, and 0.5-5% $B_2O_3$ and comprising celsian as the principal crystal phase and potash feldspar as a minor phase;
  II. crystallized glassed consisting essentially, in weight percent, of about 43-53% $SiO_2$, 24-36% $Al_2O_3$, 12-16% CaO 2-7% $K_2O$, 0-1% $As_2O_3$, 0-5% $ZrO_2$, and 0-6% $B_2O_3$ and comprising anorthite as the principal crystal phase and potash feldspar as a minor phase;
  III. crystallized glasses consisting essentially, in weight percent, of about 35-55% $SiO_2$, $Al_2O_3$, 0.5-7% MgO, 1-8% $K_2O$, 0-20% CaO, 0-1% $As_2O_3$, 0-6% $ZrO_2$, and 0-6% $B_2O_3$ and comprising anorthite and/or cordierite as the principal crystal phases and potash feldspar as a minor phase; and
  IV. crystallized glasses consisting essentially, in weight percent, of about 35-42% $SiO_2$, 34-46% $Al_2O_3$, 16-20% CaO, 0-4% $As_2O_3$, 0-5% $ZrO_2$, and 0.5-5% $B_2O_3$, and wherein anorthite constitutes the principal crystal phase, and wherein the glasses further include an optional addition of crystalline zirconia in a proportion of 0-15% by weight of the crystallized seal.

8. A bonded refractory assembly in accordance with claim 7 wherein the composite component is a fiber-reinforced composite wherein an anorthite-containing glass-ceramic constitutes the matrix phase and wherein the fiber reinforcement comprises silicon carbide or silicon oxycarbide fibers.

9. A bonded refractory assembly in accordance with claim 8 wherein the crystallized seal exhibits:
  (i) a service temperature of at least 900° C., and
  (ii) a bond strength of at least about 2500 psi.

10. A bonded refractory assembly in accordance with claim 8 wherein the crystallized seal is a seal consisting essentially, in weight percent, of about 36-43% $SiO_2$, 5-25% $Al_2O_3$, 20-25% BaO, 5-10% $K_2O$, 0-1% $As_2O_3$, 0-5% $ZrO_2$, and 0.5-6% $B_2O_3$.

11. A bonded refractory assembly in accordance with claim 8 wherein the crystallized seal is a seal consisting essentially, in weight percent, of about 43-53% $SiO_2$, 24-36% $Al_2O_3$, 12-16% CaO, 2-7% $K_2O$, 0-1% $As_2O_3$, 0-5% $ZrO_2$, and 0-6% $B_{23}$.

12. A bonded refractory assembly in accordance with claim 8 wherein the crystallized seal is a seal consisting essentially, in weight percent, of about 35-55% $SiO_2$, 25-37% $Al_2O_3$, 0.5-7% MgO, 1-8% $K_2O$, 0-20% CaO, 0-1% $As_2O_3$, 0-6% $ZrO_2$, and 0-6% $B_2O_3$.

13. A bonded refractory assembly in accordance with claim 8 wherein the crystallized seal is a seal consisting essentially, in weight percent, of about 35-42% $SiO_2$, 34-46% $Al_2O_3$, 16-20% CaO, 0-1% $As_2O_3$, 0-5% $ZrO_2$, and 0.5-5% $B_2O_3$, wherein anorthite constitutes the principal crystal phase and wherein the seal further includes an optional addition of crystalline zirconia in a proportion of 0-15% by weight.

* * * * *

UNITED STATES PATENT AND TRADEMARK OFFICE
CERTIFICATE OF CORRECTION

PATENT NO. : 4,973,564

DATED : 11/27/90

INVENTOR(S) : Kenneth Chyung, Robert M. Morena, Mark P. Taylor

It is certified that error appears in the above-identified patent and that said Letters Patent is hereby corrected as shown below:

Column 3, Line 56, paragraph at III.

Column 4, Line 42, "5≧10%" should read "5-10%".

Column 4, Line 43, "B2O3" should read "$B_2O_3$".

Column 4, Line 49, paragraph at III.

Column 4, Line 54, paragraph at IV.

Column 4, Line 56, "Al $_2O_3$" should read "$Al_2O_3$".

Column 4, Line 61, "35∝42%" should read "35-42%"

Column 6, Line 15, "10-7/°C" should read "$10^{-7}$/°C".

Column 8, Line 43, "K $_2$O" should read "$K_2O$".

Column 13, Line 16, "$Al_2)_3$" should read "$Al_2O_3$".

Column 13, Line 28, "0.5-5%" should read "0.5-6%".

Column 13, Line 31, "glassed" should read "glasses".

Column 13, Line 38, insert "25-37%" before $Al_2O_3$.

Column 14, Line 3, "0-4%" should read "0-1%" $As_2O_3$.

Column 14, Line 22, "5-25%" shoul(

Signed and Sealed this

Twenty-eighth Day of April, 1992

Attest:

HARRY F. MANBECK, JR.

*Attesting Officer*   *Commissioner of Patents and Trademarks*